(12) United States Patent
Meckes et al.

(10) Patent No.: US 11,472,561 B2
(45) Date of Patent: Oct. 18, 2022

(54) OXYGEN GENERATOR OUTLET MANIFOLD WITH IMPROVED THERMIC PROPERTIES

(71) Applicant: Zodiac Cabin Controls GmbH, Hamburg (DE)

(72) Inventors: Ruediger Meckes, Berkenthin (DE); Wolfgang Rittner, Ahrensboek (DE); Andreas Westphal, Eutin (DE); Etienne Tomasena, Lübeck (DE)

(73) Assignee: ZODIAC CABIN CONTROLS GMBH., Hamburg (DE)

( * ) Notice: Subject to any disclaimer, the term of this patent is extended or adjusted under 35 U.S.C. 154(b) by 518 days.

(21) Appl. No.: 16/739,869

(22) Filed: Jan. 10, 2020

(65) Prior Publication Data
US 2020/0239145 A1    Jul. 30, 2020

Related U.S. Application Data

(60) Provisional application No. 62/797,827, filed on Jan. 28, 2019.

(51) Int. Cl.
*B64D 13/08* (2006.01)
*A62B 21/00* (2006.01)
*B64D 13/06* (2006.01)

(52) U.S. Cl.
CPC .............. *B64D 13/08* (2013.01); *A62B 21/00* (2013.01); *B01D 2256/12* (2013.01); *B64D 2013/0681* (2013.01)

(58) Field of Classification Search
CPC ............ B64D 13/08; B64D 2013/0681; B64D 2231/02; A62B 21/00; A62B 7/14;
(Continued)

(56) References Cited

FOREIGN PATENT DOCUMENTS

| CN | 205849964 U | * | 1/2017 | |
| ES | 2336441 T3 | * | 4/2010 | .......... A61M 16/024 |

(Continued)

OTHER PUBLICATIONS

Search Report issued in European Application 20154175.2.

*Primary Examiner* — Emmanuel E Duke
(74) *Attorney, Agent, or Firm* — Jeffer Mangels; Butler & Mitchell LLP; Brennan C. Swain, Esq.

(57) ABSTRACT

An oxygen generator outlet manifold assembly that includes an outlet manifold and an end cover. The outlet manifold includes a main body portion with inner and outer surfaces and at least a first hose connector that includes an outlet defined therein extending from the main body portion. The main body portion defines a main body portion interior that includes a connection opening defined in the inner surface, a ring chamber, a flow space and a distribution chamber. An annular ring is positioned in the main body portion chamber interior and separates the ring chamber from the distribution chamber. The end cover includes a generator outlet portion extending therefrom that is received in the connection opening. The generator outlet portion includes an outlet valve having an open and a closed state and includes an interior chamber that cooperates with the ring chamber to define an outlet chamber. An oxygen flow path is defined through the open valve, to the outlet chamber, through the flow space, through the distribution chamber and to the outlet of the first hose connector.

16 Claims, 6 Drawing Sheets

(58) Field of Classification Search
CPC .. A62B 9/02; A62B 9/003; A62B 7/08; B01D 2256/12; C01B 13/0296; F16L 41/00; F16L 53/75
See application file for complete search history.

(56) References Cited

FOREIGN PATENT DOCUMENTS

| WO | 9710025 A1 | 3/1997 | | |
| WO | WO-9710025 A1 * | 3/1997 | ............. | A62B 25/00 |
| WO | 2015087077 A1 | 6/2015 | | |
| WO | WO-2015087077 A1 * | 6/2015 | ......... | C01B 13/0218 |

* cited by examiner

OXYGEN GENERATOR OUTLET MANIFOLD WITH IMPROVED THERMIC PROPERTIES

CROSS REFERENCE TO RELATED APPLICATIONS

This application claims the benefit of U.S. Provisional Application No. 62/797,827, filed Jan. 28, 2019, the entirety of which is incorporated herein by reference.

FIELD OF THE INVENTION

The present invention relates generally to an oxygen generator with improved thermic properties.

BACKGROUND OF THE INVENTION

Typical chemical oxygen generators are equipped at the generator outlet with manifolds, which allow the generator to connect pneumatically to a required number of passenger mask hoses, which then themselves connect to the oxygen masks. These manifolds are not designed for heat transfer, only for oxygen flow distribution between the chemical oxygen generator and the related oxygen masks.

The available spaces for chemical oxygen system installations is becoming smaller and smaller as airframe manufacturers and airlines try to fit as many passengers as possible onto their aircraft. Chemical oxygen generators concurrently generate heat as the production of oxygen is an exothermic reaction. If the space allowed for the oxygen generator, manifold, hoses and masks is decreased, there is less room to dissipate the heat and the temperature of these components will rise. Thus it becomes more and more important, for safety reasons, to reduce the temperature of the chemical oxygen gas flow. In particular, the manifold of the chemical oxygen generator needs to be maintained within a set temperature range because of the connected oxygen mask hoses and close proximity to the PSU housing walls. The connected oxygen mask hoses are typically made of thermoplastic materials like Polyvinyl Chloride and Polyurethane, which will degrade outside the specified temperature range.

SUMMARY OF THE PREFERRED EMBODIMENTS

In accordance with a first aspect of the present invention there is provided an oxygen generator outlet manifold assembly that includes an outlet manifold and an end cover. The outlet manifold includes a main body portion with inner and outer surfaces and at least a first hose connector that includes an outlet defined therein extending from the main body portion. The main body portion defines a main body portion interior that includes a connection opening defined in the inner surface, a ring chamber, a flow space and a distribution chamber. An annular ring is positioned in the main body portion chamber interior and separates the ring chamber from the distribution chamber. The end cover includes a generator outlet portion extending therefrom that is received in the connection opening. The generator outlet portion includes an outlet valve having an open and a closed state and includes an interior chamber that cooperates with the ring chamber to define an outlet chamber. An oxygen flow path is defined through the open valve, to the outlet chamber, through the flow space, through the distribution chamber and to the outlet of the first hose connector. In a preferred embodiment, the main body portion includes a plurality of cooling fins extending therefrom. Preferably, at least two of the plurality of cooling fins include a connection bridge extending therebetween.

In a preferred embodiment, a valve space is defined between a first stop surface on one of the plurality of fins and a second stop surface on the main body portion. A safety pressure valve is secured to the end cover and is at least partially positioned in the valve space. The outlet manifold includes at least a first tunnel defined therethrough that is in communication with the main body portion interior. The generator outlet portion has a slot defined in an outside surface thereof. A first connector extends through the first tunnel, into the main body portion interior and into the slot to secure the outlet manifold to the generator outlet portion. Preferably, the first connector is a cotter pin and at least a portion of the first tunnel is defined in at least one of the plurality of fins. In a preferred embodiment, the assembly includes a plurality of hose connectors extending from the main body portion and each of the hose connectors includes an outlet that is in fluid communication with the distribution chamber. Preferably, the fins extend generally upwardly from the main body portion and the first hose connector (and other hose connectors) extend generally downwardly from the main body portion In accordance with another aspect of the present invention there is provided an outlet manifold for use with an oxygen generator that includes a main body portion having an outer surface and an inner surface and at least a first hose connector that includes an outlet defined therein extending from the main body portion. The main body portion defines a main body portion interior that includes a connection opening defined in the inner surface, a ring chamber, a flow space and a distribution chamber. An annular ring is positioned in the main body portion chamber interior and separates the ring chamber from the distribution chamber. An oxygen flow path is defined from the ring chamber, through the flow space, through the distribution chamber and to the outlet of the first hose connector.

The need has arisen to develop a chemical oxygen generator with improved thermic properties for use in passenger service units (PSU's) onboard passenger aircraft. The chemical oxygen generator may be provided in oxygen boxes, PSU's with oxygen supply, and portable or fixed first aid breathing equipment. Types of aircraft envisioned for application of this invention include, but are not limited to, business, commercial and military aircraft. However, the invention is not limited to use on aircraft and may be used in other areas such as medical and safety equipment as well as in other vehicles or modes of transportation including but not limited to trains, cars, buses and vertical take-off and landing autonomous vehicles.

In a preferred embodiment, the present invention reduces the chemical oxygen generator outlet manifold temperature. This reduction of manifold temperature enables safe attachment of passenger oxygen mask hoses and allows installation of the chemical oxygen generator manifold in close proximity to the PSU oxygen compartment walls. Such design allows for compact oxygen equipment designs with reduced dimensions, thus allowing for more spacious cabin designs. In a preferred embodiment, the chemical oxygen generator outlet manifold is designed such that the internal flow passages are increased in area (compared to the prior art) to slow down the oxygen gas flow velocity and concurrently increase the heat transmitting convective surface area. The outside heat transmitting area is preferably increased as well by the inclusion of cooling fins, which increases the convective heat flow or dissipation. These design features decrease the temperature of the oxygen generator manifold and thus allow for a more compact design.

The present invention provides a chemical oxygen generator with an outlet manifold designed for increased heat transfer. Such increased heat transfer can be achieved as described above and with an outlet manifold that includes additional heat transfer areas. Such additional heat transfer areas may include ring chambers, setting chambers or cooling fins, with dedicated and increased heat transfer capabilities.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
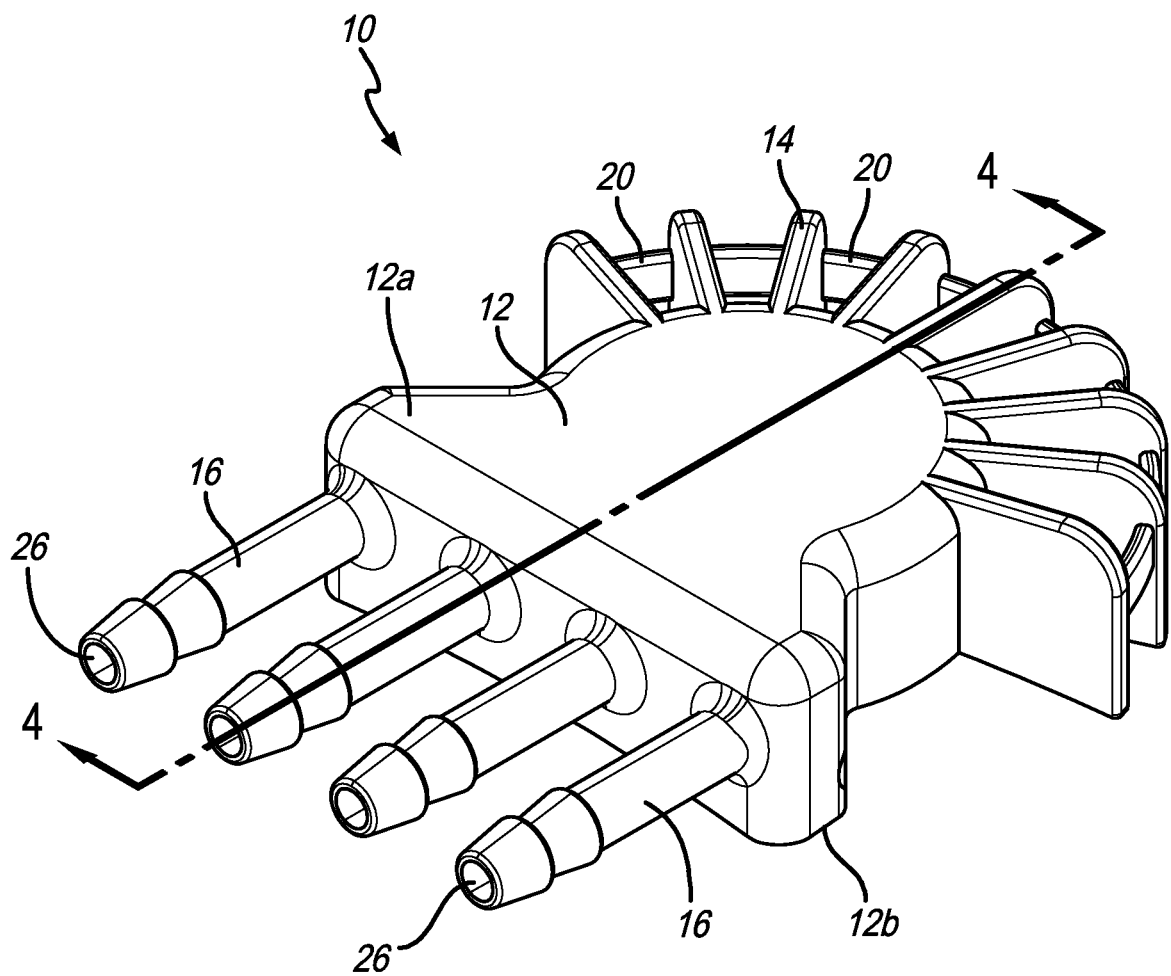
FIG. 1 is a perspective view of a chemical oxygen generator outlet manifold in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 5:
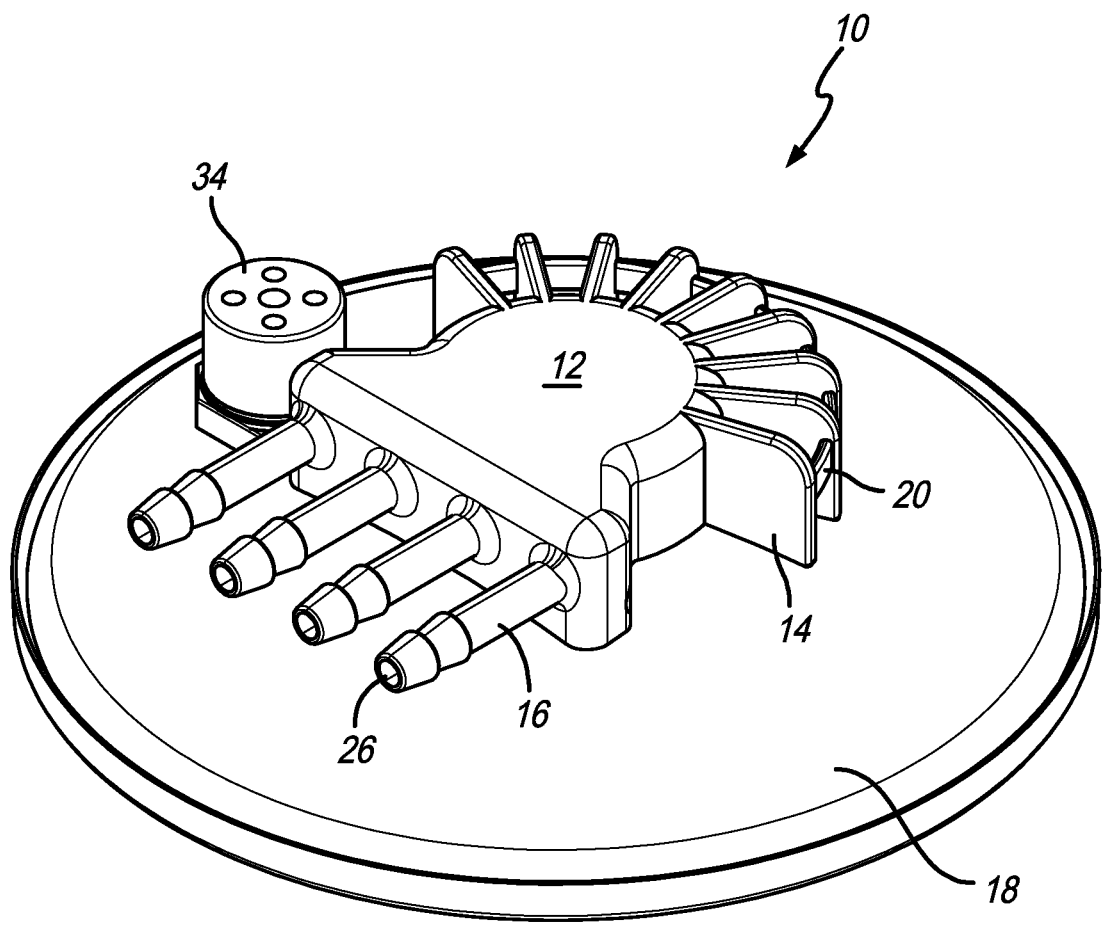
FIG. 5 is a perspective view of the outlet manifold of FIG. 1 together with an end cover of a chemical oxygen generator.
Figure 6:
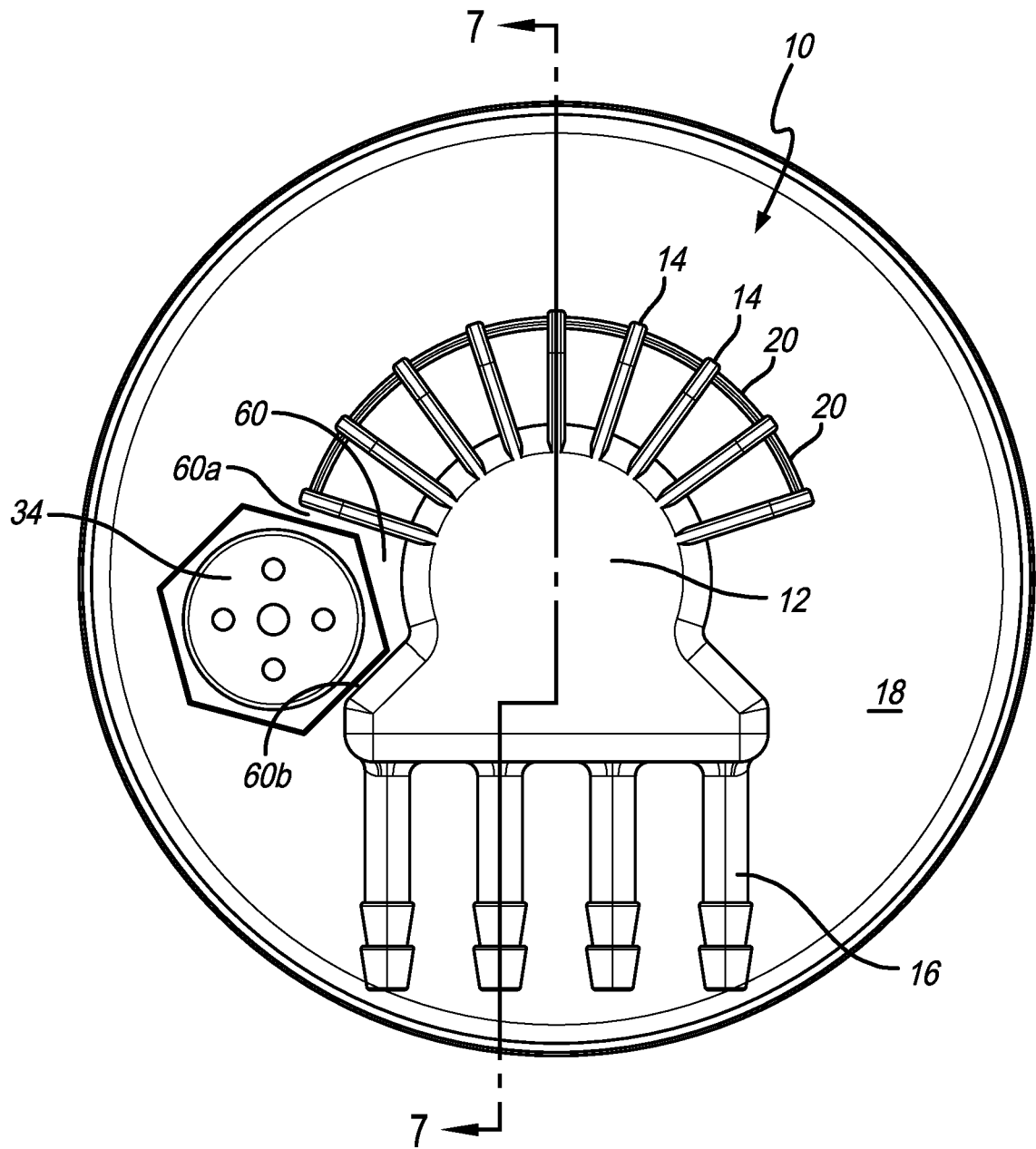
FIG. 6 is an elevational view of the outlet manifold an end cover of FIG. 6.
Figure 7:
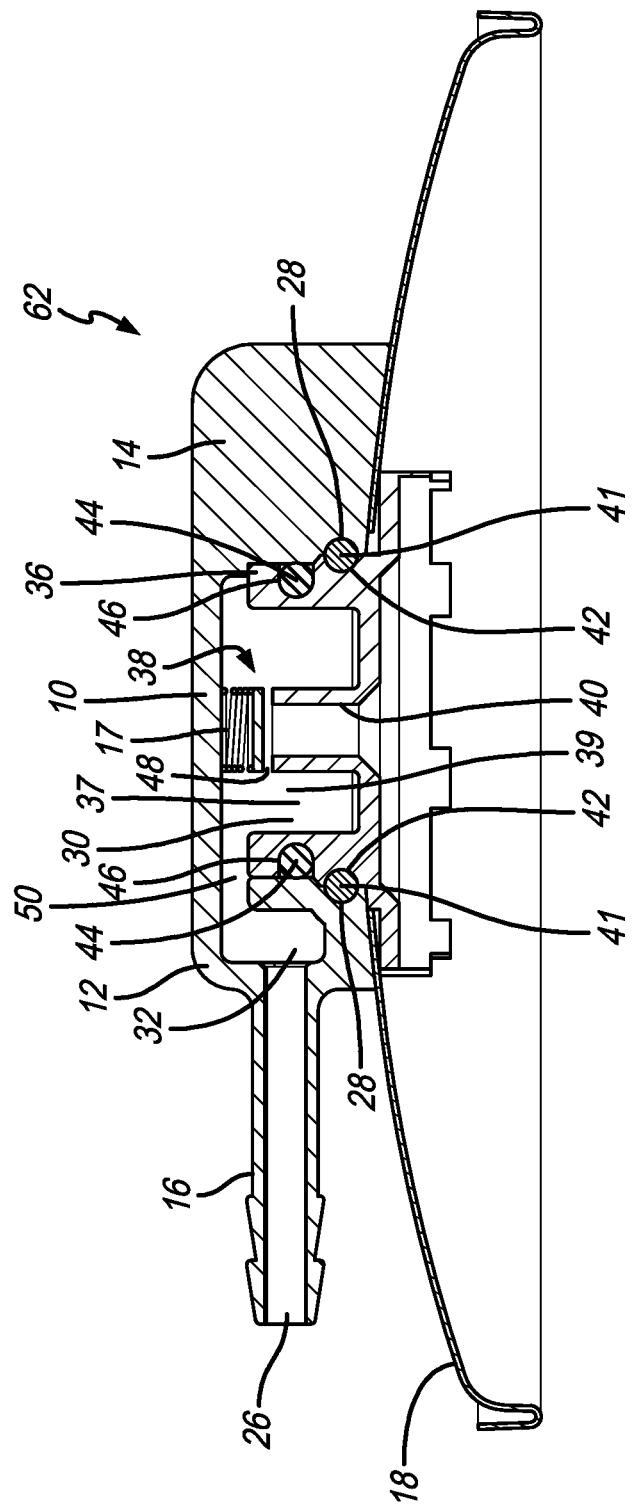
FIG. 7 is a cross-sectional view taken along line 7-7 of FIG. 6.

Referring now to the drawings, which are for purposes of illustrating the present invention and not for purposes of limiting the same, the drawings show a chemical oxygen generator outlet manifold 10. In a preferred embodiment, the chemical oxygen generator outlet manifold is used in an aircraft. However, this is not a limitation on the present invention. FIGS. 1-4 show the outlet manifold 10 alone and FIGS. 5-7 show the outlet manifold together with an end cover 18 of a chemical oxygen generator.

As shown in FIG. 1, in a preferred embodiment, the outlet manifold 10 generally includes a main body portion 12 (having an outer surface 12a and an inner surface 12b), cooling fins 14 and oxygen mask hose connectors 16. In a preferred embodiment, each of the cooling fins 14 are connected to an adjacent cooling fin via a connector bridge 20, which help prevent the fins from breaking off if impacted.

Figure 2:
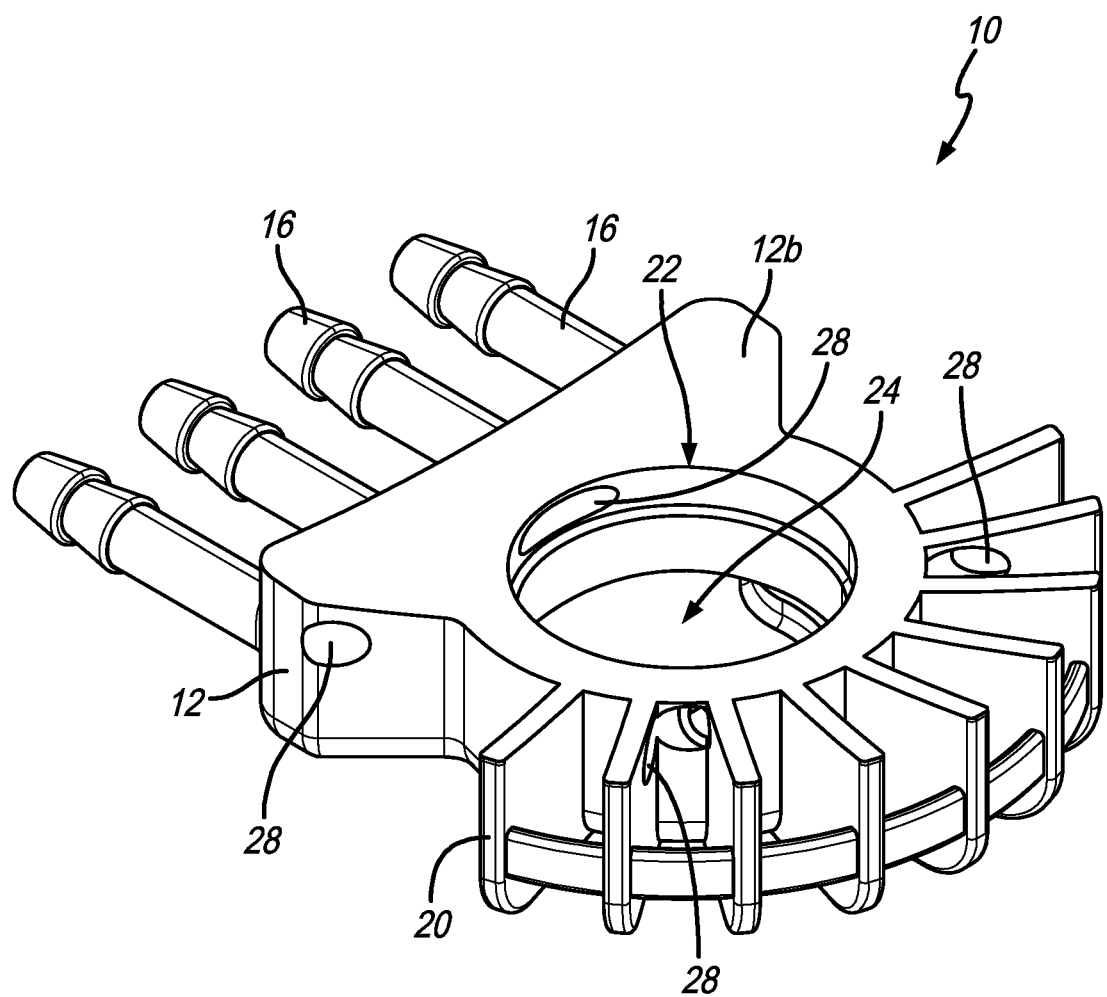
FIG. 2 is another perspective view of the outlet manifold of FIG. 1.
Figure 3:
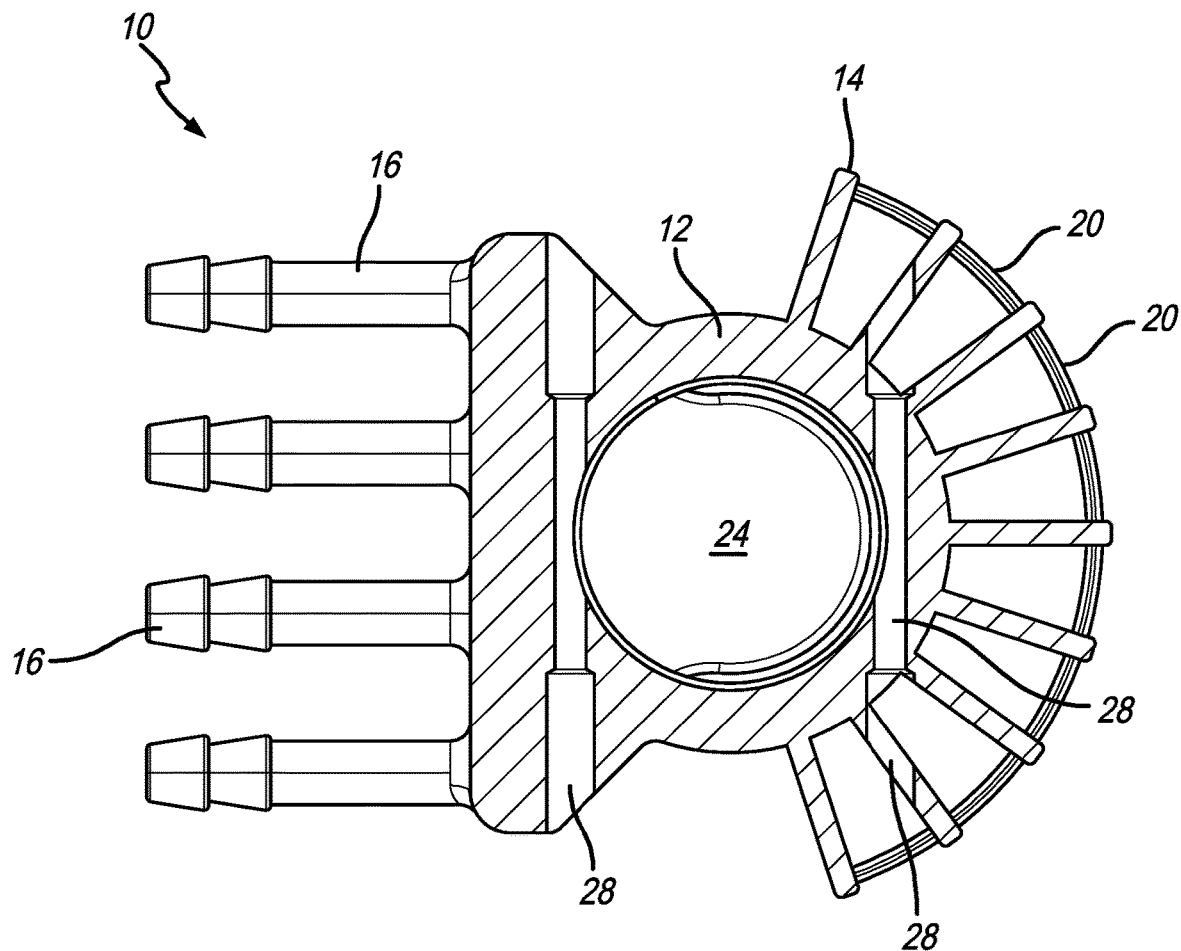
FIG. 3 is a cross-section of the outlet manifold of FIG. 1.
Figure 4:
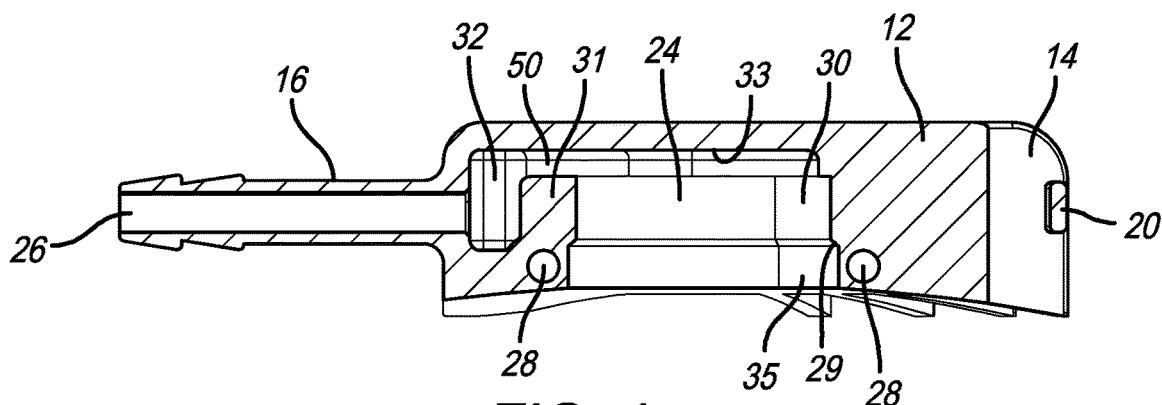
FIG. 4 is a cross-section of the outlet manifold of FIG. 1 taken along line 4-4 of FIG. 1.

With reference to FIGS. 2-4, the outlet manifold 10 includes a connection opening 22, a main body portion interior 24, a plurality of outlets 26 in each of the hose connectors 16, two tunnels 28 that extend transversely through the main body portion 12 (that receive cotter pins 41 for connecting the outlet manifold 10 to the end cover 18, as described below), a ring chamber 30 and a distribution chamber 32 that are separated from one another by an annular ring 31 (it will be appreciated that the annular ring may not be a full ring, but has a generally round shape). The outlet manifold 10 also includes a connection chamber 35 and a shoulder 29 that is positioned between the connection chamber 35 and the ring chamber 30.

As shown in FIGS. 2 and 3, a portion of one of the tunnels 28 may extend through one or more of the fins 14. Also, the tunnels 28 are preferably communicated with the main body portion interior 24 so that the cotter pins 41 can be received in the annular slot 42, discussed below. Connectors other than a cotter pin can be used to secure the manifold 10 to the generator outlet portion 36.

As shown in FIGS. 5-6, the outlet manifold 10 is attached to the outside surface 18a of the end cover 18. In a preferred embodiment, the end cover 18 includes a safety pressure valve 34, which limits the maximum operating pressure of the chemical oxygen generator. In a preferred embodiment, the safety pressure valve 34 serves as rotary protection for the outlet manifold to enable an appropriate orientation of the outlet manifold 10 and the respective oxygen mask hose connectors 16. In other words, the main body portion 12 and one of the fins 14 define a valve space 60 (see stop surfaces 60a and 60b) where at least a portion of the safety pressure valve 34 is positioned during use (see FIG. 6). Therefore, if the manifold 10 rotates with respect to the cover 18, one of the stop surfaces 60a or 60b will hit against the safety pressure valve 34 and the manifold will stop rotating. This ensures that the manifold outlets 26 are always oriented generally in the same direction.

As shown in FIG. 7, the cover 18 includes a generator outlet portion 36 that is received in the main body portion interior 24 of the main body portion. The generator outlet portion 36 includes an interior chamber 37 and an outlet valve 38 that extends through the interior chamber 37 and that moderates the flow of oxygen from the oxygen generator, through the end cover 18 and into the manifold 10. As shown in FIG. 7, the interior chamber 37 and the ring chamber 30 cooperate to define an outlet chamber 39. Any type of outlet valve is within the scope of the present invention. In a preferred embodiment, the outlet valve 38 includes a non-return valve cup 40 that is controlled by a spring 17 and that protects the chemicals of the oxygen generator against humidity during the life time of the generator.

The manifold 10 is secured to the end cover 18 and on the generator outlet portion 36 by two cotter pins 41 that extend through the tunnels 28 defined in the manifold 10 and through an annular slot 42 or slots that are defined in the generator outlet portion 36. As shown in FIG. 7, in a preferred embodiment, an O-ring 44 is positioned in an annular slot 46 (and against the inner surface of the ring chamber 30) and seals the oxygen section or oxygen path against the environment. The components shown in FIG. 7 are referred to together herein as an oxygen generator outlet manifold assembly 62.

In use, after activation of the chemical oxygen generator, the increasing oxygen pressure opens the outlet valve 38 and the oxygen flows through the outlet section defined in the outlet valve 38 through relief holes 48 of the non-return valve cup 40 and into the combined interior chamber 37 and ring chamber 30 (the outlet chamber 39). It will be appreciated that the ring chamber 30 is in material contact with the cooling fins 14, and, therefore, heat in the oxygen in the ring chamber 30 can be transferred and reduced via radiation through the manifold housing wall and the fins 14. The oxygen then flows through a flow space 50 (defined between annular ring 31 and an inner surface 33) and to the distribution chamber 32, where the oxygen is distributed to the hose connectors 16, out the outlets 26 and to the hoses and oxygen masks. It will be appreciated that the main body portion interior 24 includes the connection chamber 35, ring chamber 30, flow space 50, distribution chamber 32 and the connection opening 22.

It will be appreciated that the manner in which the manifold 10 and generator outlet portion 36 are assembled (from opposite sides of cover 18) reduces the height of the assembly compared to the prior art. As a result, the overall length of the generator in the installed space envelope is reduced, which can be beneficial in the tight spaces where the oxygen generators are positioned in commercial aircraft.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An oxygen generator outlet manifold assembly comprising:
   an outlet manifold that includes a main body portion having an outer surface and an inner surface, and at least a first hose connector that includes an outlet defined therein extending from the main body portion, wherein the main body portion defines a main body portion interior that includes a connection opening defined in the inner surface, a ring chamber, a flow space and a distribution chamber, wherein an annular ring is positioned in the main body portion chamber interior and separates the ring chamber from the distribution chamber,
   an end cover that includes a generator outlet portion extending therefrom, wherein the generator outlet portion is received in the connection opening of the outlet manifold, wherein the generator outlet portion includes an outlet valve having an open and a closed state and includes an interior chamber defined therein, wherein the interior chamber cooperates with the ring chamber to define an outlet chamber, wherein an oxygen flow path is defined through the valve when it is in the open position, to the outlet chamber, through the flow space, through the distribution chamber and to the outlet of the first hose connector.

2. The oxygen generator outlet manifold assembly of claim 1 wherein the main body portion includes a plurality of cooling fins extending therefrom.

3. The oxygen generator outlet manifold assembly of claim 2 wherein at least two of the plurality of cooling fins include a connection bridge extending therebetween.

4. The oxygen generator outlet manifold assembly of claim 2 wherein a valve space is defined between a first stop surface on one of the plurality of fins and a second stop surface on the main body portion, wherein a safety pressure valve is secured to the end cover and is at least partially positioned in the valve space.

5. The oxygen generator outlet manifold assembly of claim 2 wherein the fins extend upwardly from the main body portion and the first hose connector extends downwardly from the main body portion.

6. The oxygen generator outlet manifold assembly of claim 1 wherein the outlet manifold includes at least a first tunnel defined therethrough, wherein the first tunnel is in communication with the main body portion interior, wherein the generator outlet portion has a slot defined in an outside surface thereof, wherein a first connector extends through the first tunnel, into the main body portion interior and into the slot to secure the outlet manifold to the generator outlet portion.

7. The oxygen generator outlet manifold assembly of claim 6 wherein the first connector is a cotter pin.

8. The oxygen generator outlet manifold assembly of claim 6 wherein at least a portion of the first tunnel is defined in at least one of the plurality of fins.

9. The oxygen generator outlet manifold assembly of claim 1 further comprising a plurality of hose connectors extending from the main body portion, wherein each of the hose connectors includes an outlet that is in fluid communication with the distribution chamber.

10. An outlet manifold for use with an oxygen generator, the outlet manifold comprising:
    a main body portion having an outer surface and an inner surface, and at least a first hose connector that includes an outlet defined therein extending from the main body portion, wherein the main body portion defines a main body portion interior that includes a connection opening defined in the inner surface, a ring chamber, a flow space and a distribution chamber, wherein an annular ring is positioned in the main body portion chamber interior and separates the ring chamber from the distribution chamber, an oxygen flow path is defined from the ring chamber, through the flow space, through the distribution chamber and to the outlet of the first hose connector.

11. The outlet manifold of claim 10 wherein the main body portion includes a plurality of cooling fins extending therefrom.

12. The outlet manifold of claim 11 wherein at least two of the plurality of cooling fins include a connection bridge extending therebetween.

13. The outlet manifold of claim 10 wherein the outlet manifold includes at least a first tunnel defined therethrough, wherein the first tunnel is in communication with the main body portion interior.

14. The outlet manifold of claim 13 wherein at least a portion of the first tunnel is defined in at least one of the plurality of fins.

15. The outlet manifold of claim 10 further comprising a plurality of hose connectors extending from the main body portion, wherein each of the hose connectors includes an outlet that is in fluid communication with the distribution chamber.

16. The outlet manifold of claim 15 wherein the fins extend upwardly from the main body portion and the plurality of hose connectors extend downwardly from the main body portion.

* * * * *